(12) United States Patent
Liao (10) Patent No.: US 10,142,435 B2
(45) Date of Patent: Nov. 27, 2018

(54) METHOD, DEVICE AND COMPUTER STORAGE MEDIUM FOR IMPLEMENTING INTERFACE CACHE DYNAMIC ALLOCATION

(71) Applicant: Sanechips Technology Co., Ltd., Shenzhen (CN)

(72) Inventor: Zhiyong Liao, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 357 days.

(21) Appl. No.: 14/909,705

(22) PCT Filed: May 19, 2014

(86) PCT No.: PCT/CN2014/077830
§ 371 (c)(1),
(2) Date: Feb. 2, 2016

(87) PCT Pub. No.: WO2015/089984
PCT Pub. Date: Jun. 25, 2015

(65) Prior Publication Data
US 2016/0191647 A1    Jun. 30, 2016

(30) Foreign Application Priority Data
Dec. 17, 2013  (CN) .......................... 2013 1 0695197

(51) Int. Cl.
*H04L 29/08*    (2006.01)
*G06F 12/08*    (2016.01)
(Continued)

(52) U.S. Cl.
CPC ........ H04L 67/2842 (2013.01); *G06F 12/084* (2013.01); *G06F 12/0813* (2013.01);
(Continued)

(58) Field of Classification Search
CPC . H04L 67/2842; G06F 13/128; G06F 12/084; G06F 12/0813; G06F 12/0844; G06F 2212/6042; G06F 2212/154
(Continued)

(56) References Cited

U.S. PATENT DOCUMENTS 4,503,501 A * 3/1985 Coulson .................. G06F 13/00
                                                          364/200
5,428,754 A * 6/1995 Baldwin .................... G06F 1/08
                                                             712/220

(Continued)

FOREIGN PATENT DOCUMENTS

CN    1209213 A    2/1999
CN    1761222 A    4/2006
(Continued)

OTHER PUBLICATIONS

International Search Report in international application No. PCT/CN2014/077830, dated Sep. 22, 2014.
(Continued)

*Primary Examiner* — David R Lazaro
*Assistant Examiner* — Berhanu Shitayewoldetadik
(74) *Attorney, Agent, or Firm* — Oppedahl Patent Law Firm LLC (57) ABSTRACT

A method for implementing interface cache dynamic allocation is disclosed in the present invention. The method includes: setting, in advance or when a system is running, the corresponding relationship between a free cache block and an interface required to be accessed in the application, and then sending data packets inputted from the interface to the cache block; when the system is running, if the interface required to be accessed needs to be increased, revoked or modified, adjusting the corresponding relationship between the changed interface and the corresponding cache block in (Continued)

real time. A device and computer storage medium for implementing the method are also disclosed in the present invention.

7 Claims, 4 Drawing Sheets

(51) Int. Cl.
  *G06F 12/0813* (2016.01)
  *G06F 12/0844* (2016.01)
  *G06F 12/084* (2016.01)
  *G06F 13/12* (2006.01)
(52) U.S. Cl.
  CPC ........ *G06F 12/0844* (2013.01); *G06F 13/128* (2013.01); *G06F 2212/154* (2013.01); *G06F 2212/6042* (2013.01)
(58) Field of Classification Search
  USPC .................................................. 709/213, 215
  See application file for complete search history.

(56) References Cited

U.S. PATENT DOCUMENTS

| | | | | |
|---|---|---|---|---|
| 5,596,727 | A | 1/1997 | Literati | |
| 5,724,586 | A * | 3/1998 | Edler | G06F 9/46 364/228.3 |
| 5,799,209 | A | 8/1998 | Chatter | |
| 6,108,725 | A * | 8/2000 | Chatter | G06F 12/0893 710/107 |
| 6,577,625 | B1 | 6/2003 | Chiou | |
| 6,606,301 | B1 * | 8/2003 | Muller | H04L 47/10 370/230 |
| 6,789,077 | B1 * | 9/2004 | Slaughter | G06F 9/465 |
| 8,135,796 | B1 * | 3/2012 | Slaughter | G06F 9/465 709/217 |
| 8,639,658 | B1 * | 1/2014 | Kumaresan | G06F 3/0641 707/609 |
| 9,064,124 | B1 * | 6/2015 | Davis | G06F 21/606 |
| 9,134,980 | B1 * | 9/2015 | Cabrera | G06F 8/48 |
| 9,654,546 | B1 * | 5/2017 | Narsude | H04L 67/10 |
| 2003/0147410 | A1 * | 8/2003 | Hsu | H04L 49/351 370/412 |
| 2006/0233191 | A1 * | 10/2006 | Pirzada | H04N 21/4126 370/463 |
| 2007/0171921 | A1 * | 7/2007 | Wookey | G06F 3/1415 370/401 |
| 2009/0109959 | A1 * | 4/2009 | Elliott | H04L 12/14 370/352 |
| 2011/0098087 | A1 * | 4/2011 | Tseng | G01C 21/265 455/557 |
| 2011/0225372 | A1 * | 9/2011 | Pirog | G06F 9/3851 711/141 |
| 2012/0270567 | A1 * | 10/2012 | Johnson | H04W 4/14 455/456.3 |
| 2013/0268973 | A1 | 10/2013 | Archibong | |
| 2014/0073357 | A1 * | 3/2014 | Johnson | H04W 4/025 455/456.3 |
| 2015/0113223 | A1 * | 4/2015 | Brown | G06F 12/023 711/133 |
| 2015/0256639 | A1 * | 9/2015 | Chow | H04L 67/2842 709/213 |
| 2015/0355842 | A1 * | 12/2015 | Liu | G06F 3/0625 711/103 |

FOREIGN PATENT DOCUMENTS

| | | |
|---|---|---|
| CN | 101364948 A1 | 2/2009 |
| CN | 102185725 A | 9/2011 |
| CN | 102347891 A | 2/2012 |
| CN | 102609362 A | 7/2012 |

OTHER PUBLICATIONS

English Translation of the Written Opinion of the International Search Authority in international application No. PCT /CN2014/ 077830, dated Sep. 22, 2014.

Supplementary European Search Report in European application No. 14871491.8, dated Oct. 31, 2016.

* cited by examiner

METHOD, DEVICE AND COMPUTER STORAGE MEDIUM FOR IMPLEMENTING INTERFACE CACHE DYNAMIC ALLOCATION

TECHNICAL FIELD

The disclosure relates to the field of network transfer control, and in particular to a method and device for dynamic interface cache allocation, and non-transitory computer-readable storage medium.

BACKGROUND

With continuous upgrading of network capacity, a number of interfaces supported in a router keeps increasing, with an increasing requirement on flexibility to adapt to requirements of different application scenes. Combination of interfaces requesting access may differ in different application scenes. This requests a present design must support any interface in a possible application scene. For simultaneous access by multiple interfaces, a cache exclusive to each accessing interface has to be allocated for simultaneous data caching reception. However, when one exclusive cache is allocated for each supported interface, it will inevitably result in an increased number of caches and increased cache capacity. In case of constant cache capacity, this often will limit a number of interfaces supported by a router. Therefore, it is vital for a router to effectively use and share an interface cache in order to support more interfaces.

To support more interfaces using less cache, list-based cache sharing is being commonly used. However, in case of simultaneous access by multiple interfaces, traffic input by an interface cannot be limited accurately using list-based cache sharing. This may lead to synchronized packet sending operation and stop of the packet sending operation at all interfaces, resulting in system traffic in constant burst and turbulence, greatly jeopardizing system stability. By limiting traffic input by an interface, it means that when stored volume in a receiving cache of the interface reaches a threshold, back pressure has to be exerted on the interface requesting it to reduce data volume input to avoid cache overflow.

SUMMARY

In view of this, an embodiment herein may provide a method and device for dynamic interface cache allocation, and non-transitory computer-readable storage medium.

A technical solution according to an embodiment herein may be implemented as follows.

According to an embodiment herein, a method for dynamic interface cache allocation may include:

setting, in advance or while a system is running, a docking relation of an interface requiring access in application with a cache block available, and then transferring a data packet input by the interface into the cache block; while the system is running, when it is determined that a change in an interface requiring access is required, adjusting, in real time, a docking relation of an interface involved in the change with a cache block corresponding to the interface involved in the change.

An embodiment herein may further provide a device for dynamic interface cache allocation. The device may include an interface, a cache block, and a dynamic cache configuring module.

The dynamic cache configuring module may be configured for: setting, in advance or while a system is running, a docking relation of an interface requiring access in application with a cache block available, and then transferring a data packet input by the interface into the cache block.

The dynamic cache configuring module may further be configured for: while the system is running, when it is determined that a change in an interface requiring access is required, adjusting, in real time, a docking relation of an interface involved in the change with a cache block corresponding to the interface involved in the change.

An embodiment herein may further provide a non-transitory computer-readable storage medium, storing a computer program configured for executing the method for dynamic interface cache allocation.

With a method and device for dynamic interface cache allocation, and non-transitory computer-readable storage medium according to an embodiment herein, a docking relation of an interface requiring access in application with a cache block available is set in advance or while a system is running; then a data packet input by the interface is transferred into the cache block; while the system is running, when it is determined that a change in an interface requiring access is required, a docking relation of an interface involved in the change with a cache block corresponding to the interface involved in the change is adjusted in real time. It may be seen that with an embodiment herein, a docking relation between a cache block and an interface may be modified dynamically according to a system interface access requirement, achieving support to more interfaces using less cache, such that dynamic cache sharing may be implemented. Thus, when system interface access topology is required to be adjusted dynamically, docking between a cache block and a new interface may be completed straightforwardly without the need to stop or reboot, achieving smooth system data transition. In addition, more interfaces may be supported with a limited number of caches to meet demands in multiple different scenes.

BRIEF DESCRIPTION OF THE DRAWINGS

In the drawings (which is not drawn to scale), like reference signs may represent like parts in different views. Like reference signs with different letter suffixes may represent different examples of like parts. The drawings generally show various embodiments discussed herein in an exemplary non-limiting way.

DETAILED DESCRIPTION

To facilitate understanding, list-based cache sharing may be introduced first.

In list-based cache sharing, first, an application for a storage space is sent to a router according to use of a shared cache. When there is a remaining storage space available for data storage, a data entity may be deposited into the shared cache according to a law. At the same time, information such as a storage address of the data in the shared cache may be put into a list. As long as there is remaining space in the shared cache, further data entry may be allowed so as to make the best of the overall cache space. When the data are to be dispatched from the shared cache, the data may be read out from the shared cache according to address information in the list. Then, the cache space address occupied by the data may be released for further data usage. Depending on system complexity, a single list or multiple lists may be used to control the entire sharing operation. With list-based cache sharing, cache utilization may be increased. However, list-based cache sharing only allows serial data entry. That is, the data may be deposited in the shared cache only one by one sequentially. When a system has multiple interfaces in simultaneous access, inevitably data of the multiple interfaces may have to be gathered first, and 1 data stream thereof may have to be selected as output based on a Round-Robin way before list-based data sharing can be performed. The gathering operation necessitates addition of a cache stage in front of the shared cache. This increases difficulty in front stage implementation.

With list-based cache sharing, data storage space of all interfaces is shared. When storage in an overall cache reaches a threshold and back pressure has to be exerted on an inputting interface, it cannot be known accurately from which interface data in burst are transferred. Therefore, back pressure cannot be exerted on that interface to reduce data volume input thereby. However, as the cache threshold has been reached, back pressure has to be exerted on all interfaces to stop the interfaces from outputting data. After data in the shared cache have been dispatched gradually, there are more available cache addresses, and the back pressure is to be withdrawn. After the back pressure is withdrawn, all interfaces again start to input data to the cache, resulting in synchronized data at all interfaces. This may lead to serious bursts where data are always sent and stopped being sent simultaneously at all interfaces of the entire system, such that the system cannot work under a constant smooth traffic, but has a system traffic in serious turbulence.

In an embodiment herein, a docking relation of an interface requiring access in application with a cache block available is set in advance or while a system is running. Then a data packet input by the interface is transferred into the cache block. While the system is running, when it is determined that a change in an interface requiring access is required, a docking relation of an interface involved in the change with a cache block corresponding to the interface involved in the change is adjusted in real time.

The disclosure may be further elaborated below with reference to drawings and embodiments.

Embodiment 1

Figure 1:
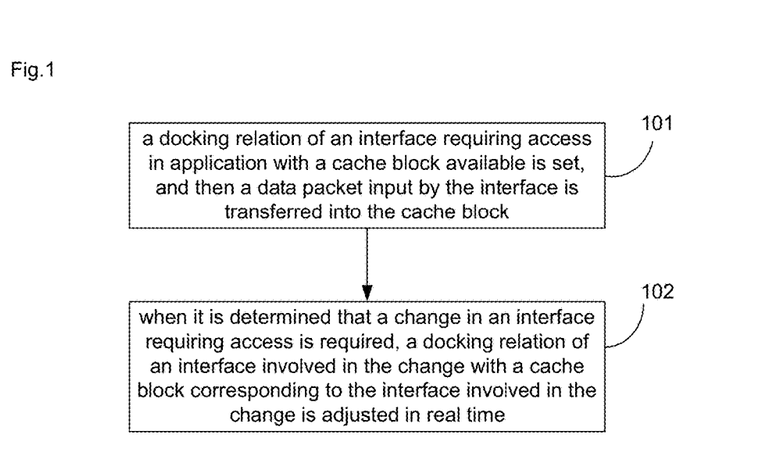
FIG. 1 is a flowchart of a method for dynamic interface cache allocation according to an embodiment herein.

FIG. 1 is a flowchart of a method for dynamic interface cache allocation according to an embodiment herein. As shown in FIG. 1, the method may include steps as follows.

In step 101, a docking relation of an interface requiring access in application with a cache block available is set in advance or while a system is running. Then a data packet input by the interface is transferred into the cache block.

Here, assume that there are a total number of M interfaces supported by the system and N cache blocks receiving data ($M \geq N$). However in actual use, often there will be no more than N interfaces being used simultaneously. Thus, it is possible to support M interfaces using N caches. The N cache blocks may be obtained by equally dividing the entire interface cache.

In an embodiment herein, a multi-input multi-output cross matrix (with input number $\geq$ output number) may be set between the interfaces and the cache, and an input of each interface supported by the system may be set to be connected respectively to a cache block through the cross matrix. A communication path from an interface to a cache block may be modified dynamically using the cross matrix. Therefore, when a system modifies interface access topology, a docking relation between a cache block and an interface may be configured before the system works, or may be modified dynamically while the system is running, ensuring smooth, correct transition and change in system access topology.

In an embodiment herein, a data packet input by an interface may be stored using one cache stage.

In step 102, while the system is running, when it is determined that a change in an interface requiring access is required, a docking relation of an interface involved in the change with a cache block corresponding to the interface involved in the change is adjusted in real time.

During a system run, when a new interface is to be added, a cache block available in the system may be detected, and a docking relation of the new interface with the detected cache block available may be set. After the setting completes, a data packet input by the new interface may be stored in the cache block.

When it has been determined that one or more interfaces are not in use and are to be withdrawn during the run, a docking relation of an interface to be withdrawn with a cache block corresponding to the interface to be withdrawn may be removed. The cache block may then become available.

One or more interfaces may be involved in a change during the run. For example, when a first interface is to be withdrawn and replaced by a second interface, first a docking relation of the first interface to be withdrawn with a cache block corresponding to the first interface to be withdrawn may be removed to disconnect the cache block from the first interface, and then a docking relation of the second interface with the cache block may be set. That is, a docking relation of the second interface with the cache block previously (before the replacement) corresponding to the first interface may be set.

It may be seen that with an embodiment herein, a docking relation between a cache block and an interface may be modified dynamically according to a system interface access requirement, achieving support to more interfaces using less cache, such that dynamic cache sharing may be implemented. Thus, when system interface access topology is to be adjusted dynamically, docking between the cache block and a new interface may be completed straightforwardly without the need to stop or reboot, achieving smooth system data transition. In addition, more interfaces may be supported with a limited number of caches to meet demands in multiple different scenes.

After a docking relation of an interface requiring access/a new interface with a cache block available is set, a starting position of a present data packet being input by the interface may be detected. After such a position is detected, the cache block may start receiving the data packet.

When the interface requiring access is to be withdrawn, an ending position of a present data packet may be detected. After such a position is detected, a docking relation of the interface to be withdrawn with a cache block corresponding to the interface to be withdrawn may start to be removed. In such a case, a data packet having been deposited in the cache block is not affected, and will be dispatched normally.

The method may ensure that each setting modification happens at a data packet boundary. That is, configured access may take effect at a starting position of a data packet, and configured withdrawal may take effect at the end of a data packet, avoiding data packet transfer being truncated during an interface change, ensuring data packet integrity.

A working mode of an interface requiring access may be set. While the system is running, a packet compatible with a working mode of an interface may be selected and transferred.

A working mode of an interface may refer to a packet type, an interface type supported by the interface, etc. A packet type may include a whole packet mode and/or an interleaving mode, etc. A whole packet mode may refer to sequential delivery of data packets with identical IDs. An interleaving mode may refer to alternating delivery of data packets with different IDs.

A data packet transferred from the interface into the cache block may be detected. A data packet incompatible with a detection rule may be discarded. A data packet compatible with the detection rule may be stored in the cache block for subsequent dispatch or output. Thus, any actual data packet ultimately deposited in the cache block is a correct packet required by the system, increasing cache utilization.

A docking relation between a cache block and an accessing interface may be detected in real time. A warning may be given when it is determined that the cache block and the accessing interface are not in one-on-one correspondence to inform a user to inspect present configuration between any cache block and an interface to prevent malfunction.

In an embodiment herein, to ensure uniqueness of a connection between a cache block and an interface, namely, one-on-one correspondence between a cache block and an interface, one interface may access no more than one cache block. It is required to detect present configuration for any cache block. In case of a misconfiguration by a user, the misconfiguration may be rejected. At the same time, an interrupting reporting warning software may be generated, informing a user to inspect present configuration for all cache blocks. After a setting of a docking relation of an interface with a cache block takes effect, the interface may dock with the cache block exclusively. In docking an interface with a cache block, when any other cache block is presently in a docking relation with the interface, the present configuration cannot take effect. In this case, a warning may be issued to require a user to re-inspect configuration of all cache blocks.

Embodiment 2

Figure 2:
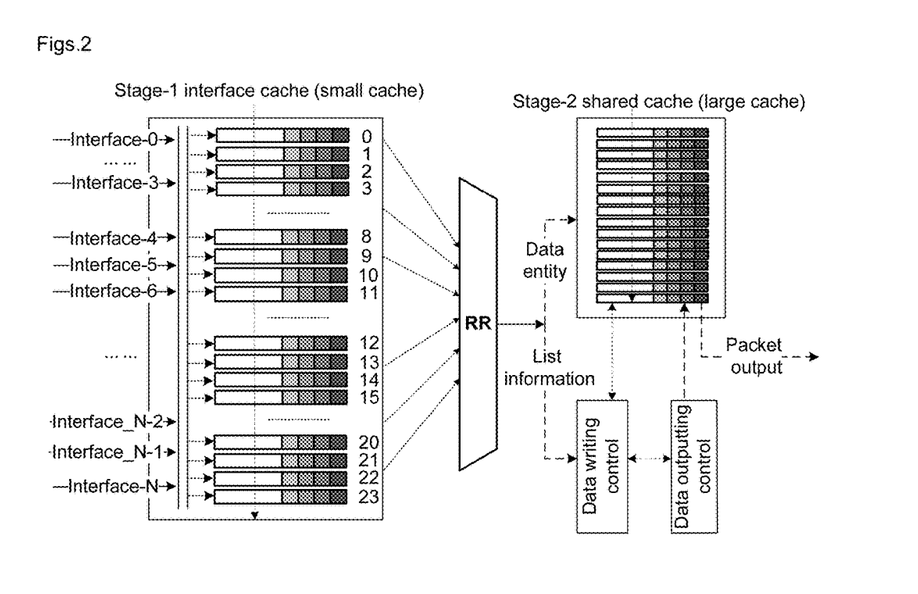
FIG. 2 is a diagram of list-based cache sharing according to an embodiment herein.

To clearly express the disclosure and investigate a difference thereof compared with list-based cache sharing, the embodiment may be illustrated based on a scene where multiple interfaces simultaneously receive packets. FIG. 2 shows list-based cache sharing. To handle simultaneous input by multiple interfaces by list, two cache stages have to be used, with a very small first-stage interface cache mainly for gathering multiple interfaces and a large-capacity second-stage shared cache as an actual data storage main body. At one moment, each interface may send a packet slice to the first-stage interface cache. Receiving caches may perform integrity inspection on a packet, such as to inspect whether the packet is a complete packet and/or of a packet type allowed to enter and/or an excessively long/short packet. A packet incompatible with a standard will be discarded by the cache, as long as the interface cache must be able to accommodate a complete packet. Otherwise, written is data cannot be deleted. However, in order to save cache resources, often the first-stage cache will not be allocated with so much space, such that such a wrong packet is passed down and enter the shared cache, and then deleted by list operation. In this way, a processing time sequence of the second stage is wasted in addition to shared cache space occupation. Data in the first-stage interface cache may be dispatched sequentially, gathered into one output, and sent to the second-stage shared cache for operation. Common dispatching may include Round Robin (RR) dispatching or Strict Priority (SP) dispatching. A list management may apply for a cache storage space for a gathered and entered packet according to an available list, and write the packet into the shared cache. Then, information on an address of the data in the shared cache may be written into a node list such that data may be read out from the address in dispatching.

When data burst occurs to one or more interfaces thereof, instant traffic increases sharply, as commonly seen in an actual situation. When the cache cannot absorb the present data, back pressure on a relevant interface is required to let it reduce sent data volume. Due to the two-stage cache, when back pressure is issued by the first-stage interface cache, a back pressure threshold may easily be reached due to the small cache capacity, leading to frequent back pressure on various interfaces, forming traffic turbulence. When back pressure is signaled by the second-stage shared cache, as with gathered data it is difficult to know which interface the packet burst come from, back pressure has to be exerted on all interfaces. In this case, all interfaces stop packet caching. Packets may be dispatched out of the cache continuously. When the cache space is less than a threshold, back pressure on all interfaces may again be withdrawn, such that the interfaces may resume packet sending, leading to synchronized packet sending and stop of packet sending at all interfaces, resulting in system traffic in constant burst and turbulence, greatly jeopardizing system stability.

Figure 3:
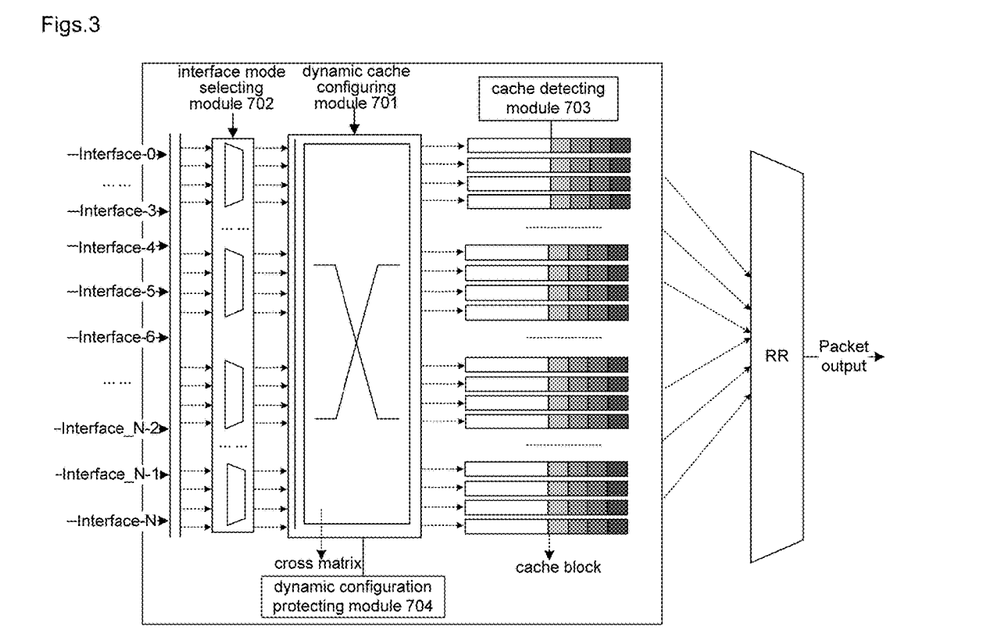
FIG. 3 is a diagram of cache sharing with dynamic interface cache allocation according to an embodiment herein.

In view of the problem in handling simultaneous receiving by multiple interfaces with list-based cache sharing, an embodiment herein may adopt a single cache stage. As shown in FIG. 3, effective cache sharing may be implemented by increasing the first-stage interface cache and its flexible dynamic hook with various interfaces. Assume that a maximal number of M interfaces are supported by the system. The overall cache may be equally divided into N blocks (M≥N). In actual use, often no more than N interfaces will be used simultaneously (N interfaces are shown in FIG. 3), such that it is possible to support M interfaces using N cache blocks. The size of each cache block must be able to accommodate a maximal data packet, such that wrong packet deletion may be performed. Using a cross matrix, dynamic hook mapping, disconnection, and change between an interface and a cache-block may be implemented, achieving simple easy dynamic cache block allocation. Cache blocks of various interfaces are independent from each other. Therefore, interface-level back pressure may be performed effectively, such that only an interface with traffic burst is limited, while any other interface may work normally. In addition, a cache block of an interface may effectively delete a stored wrong packet, a subsequent-stage time sequence may be used better.

Figure 4:
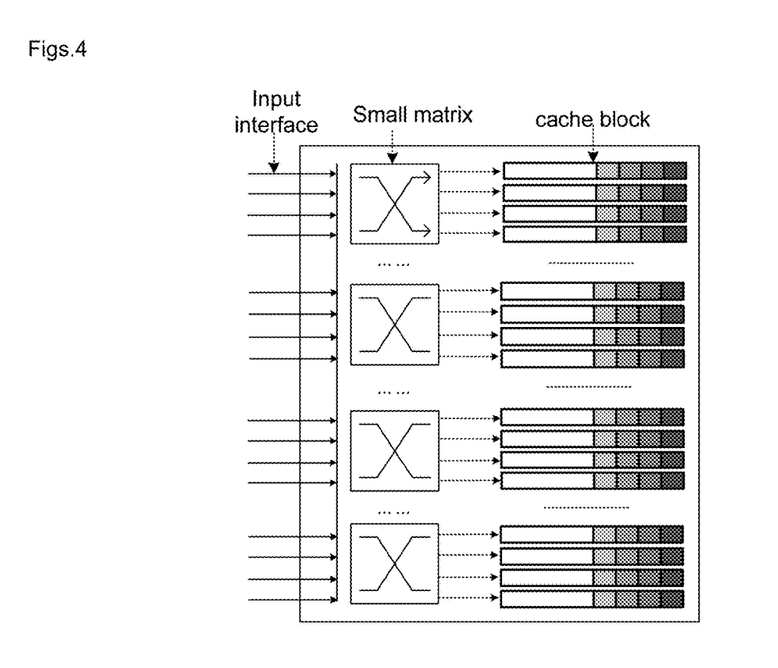
FIG. 4 is a diagram of a structure of a multi-input-output cross matrix with dynamic interface cache allocation according to an embodiment herein.

A focus of the embodiment may be the cross matrix. Inputs of all interfaces may be connected to the matrix. Each output of the matrix may be sent respectively into a cache block. As shown in FIG. 4, given a tradeoff between resources and implementation, multiple small matrices connected in parallel may be implemented within an actual dynamic cache allocating matrix. Each such small matrix may be responsible for hooking 4 cache blocks. An input of each such small matrix may access an interface. An output of each such small matrix may be connected to 4 cache blocks. A communication path from an interface to a cache block may be modified by configuring the multi-input multi-output cross matrix (input number output number). Therefore, it may be ensured that each configured modification happens at a data packet boundary. That is, configured access may take effect at a starting position of a data packet, and configured withdrawal may take effect at the end of a data packet. When a change happens to an interface, withdrawal followed by re-hook may be performed.

In addition, to ensure uniqueness of a connection between a cache block and an interface, namely, that one interface may access no more than one cache block, detecting present configuration for any cache block. In case of a misconfiguration by a user, the misconfiguration may be rejected. At the same time, a warning software may be generated, informing a user to inspect present configuration for all cache blocks to prevent malfunction. After a configured docking relation of an interface with a cache block takes effect, the interface may dock with the cache block exclusively.

Each configured cache block may only receive and verify data from a corresponding interface. A packet incompatible with an inspection rule may be discarded by the cache directly. Any actual packet ultimately deposited in the cache is is a correct packet required by the system, increasing cache utilization.

When an interface requires access during system run, as long as there is a remaining cache block, a cache block may be dock dynamically with the interface. Likewise when an interface is to be withdrawn, a cache block corresponding to the interface may be removed from the interface according to setting to release the cache block. Data remaining in the cache block will be dispatched normally. When all cache blocks have been allocated, no more interface access may be allowed, unless an interface presently in use is withdrawn and a cache block occupied by the interface is released. In such case, the released cache block may again be allocated to a new interface dynamically.

As shown in FIG. 3, all interface cache may be dispatched by RR to gather data of multiple interfaces and output gathered data to the next stage.

Embodiment 3

Figure 5:
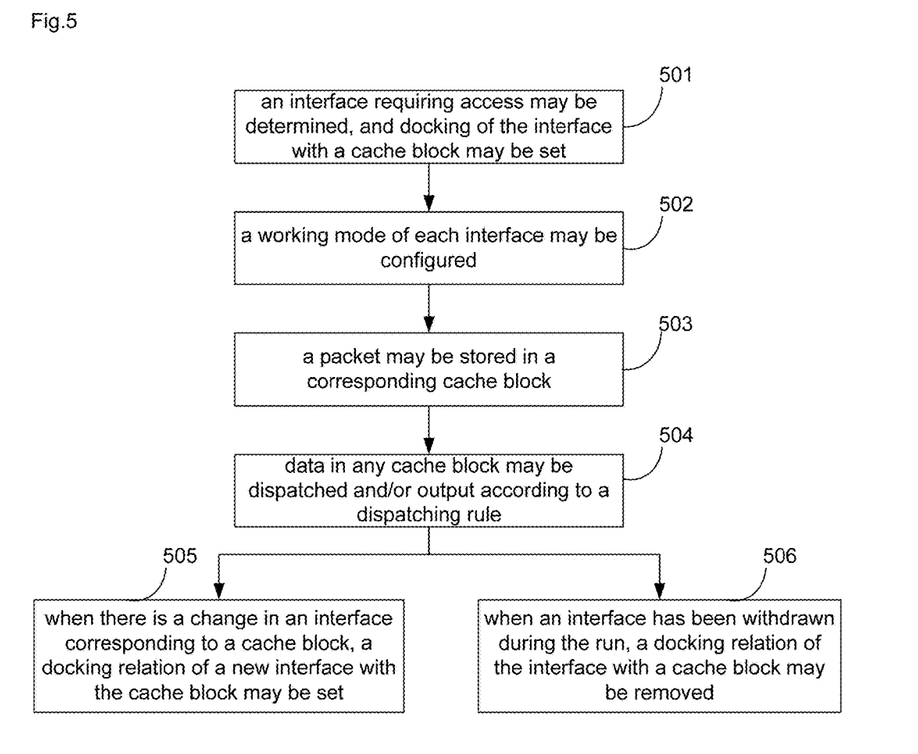
FIG. 5 is a flowchart of a method for dynamic interface cache allocation in an application scene according to an embodiment herein.

An embodiment herein may provide a method herein in an application scene. As shown in FIG. 5, the method may include steps as follows.

In step 501, an interface requiring access may be determined according to a requirement of an application scene. Docking of the interface with a cache block may be set. A cache block available may be selected and docked with the interface.

In step 502, a working mode of each interface, such as a whole packet mode/an interleaving mode, as well as an ID of a data packet received by a related cache block in the interleaving mode, may be configured.

In step 503, a packet may be stored in a cache block corresponding to the setting, for a call by a subsequent module.

In step 504, data in any cache block may be dispatched and/or output according to a dispatching rule such as RR and SP. An output packet may be sent to a next stage for processing.

In step 505, when it is determined that an old interface corresponding to a cache block is to be withdrawn during the run and that a new interface is to be added, by setting the cache block to be disconnected from the old interface, a dynamic cache allocating module may ensure that the disconnection occurs at the ending position of a packet. The cache block may be set to be docked with the new interface. The setting may take effect at the starting position of a packet of the new interface. A working mode of the new interface may be set. A new packet receiving process may be performed.

In step 506, likewise when it is determined that an interface is to be withdrawn during the run, a docking relation between a cache block and the interface may be removed dynamically. A packet having been deposited in the cache block is not affected, and will be dispatched normally.

Embodiment 4

Figure 6:
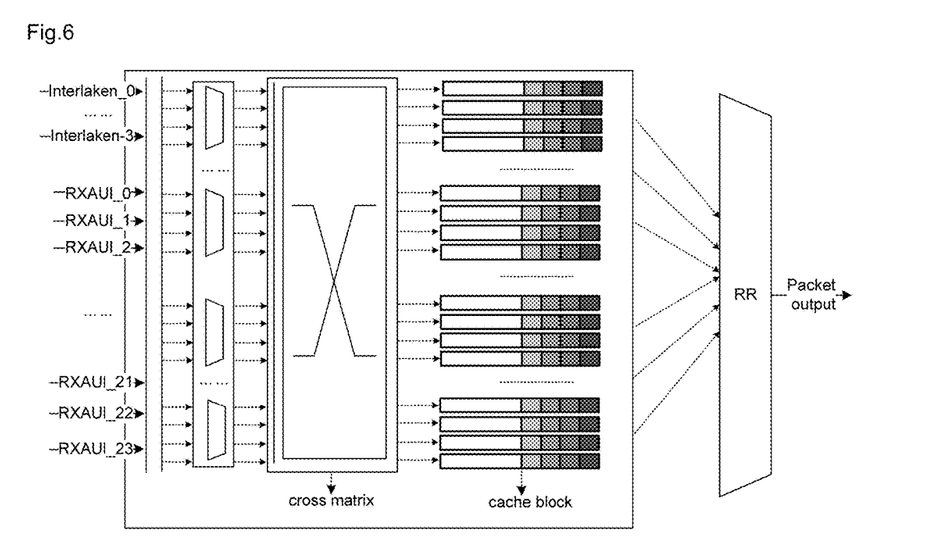
FIG. 6 is a diagram of a docking relation between a cache block and an interface in an actual application according to an embodiment herein.

The disclosure may be illustrated with an example of a switched access chip with a traffic of 200 Gbps. As shown in FIG. 6, the chip may perform access using high-speed RXAUI interface and Interlaken interface. A single RXAUI may have a rate of 10 Gbps. A single Interlaken interface may have a rate of up to 50~200 Gbps. The 200 Gbps-traffic switched access chip may support 24 RXAUIs and 4 Interlaken interfaces. Depending on occasions, a supported scene may be as follows.

2×100 Gbps Ethernet interface; or, 2×40 Gbps Ethernet interface; or, 4×40 Gbps Ethernet interface; or, 4×40 Gbps POS interface; or, 20×10 Gbps Ethernet interface.

Sub-Embodiment 1

For 100 Gbps Ethernet access, 10 RXAUIs may be accessed. Each interface may be configured with a cache block and a working mode. Packet receiving may then start.

As needed, the system traffic may be upgraded to 200 Gbps. Additional 10 RXAUIs may be required. In this case, as long as the remaining cache blocks are hooked to the new RXAUIs, the RXAUIs may start working and receive a packet normally. At the same time, when failure occurs to an RXAUI, a cache block corresponding to the failed RXAUI may be hooked to a new RXAUI. Data having been delivered by the original RXAUI will be passed on according to a normal flow.

Sub-Embodiment 2

2 Interlakens may be used as system accessing interfaces. Each Interlaken interface may support 100 Gbps traffic. The two Interlaken interfaces may be denoted by Interlaken-0 and Interlaken-1, respectively. 10 ID sub-interfaces may be used in each Interlaken interface. Such an ID may be for packet characteristics differentiation. A receiving cache may be allocated to each ID sub-interface of each Interlaken. Each Interlaken may use/take up 10 cache blocks. The 2 Interlakens may use a total of 20 cache blocks. Each ID sub-interface may be assigned an equal traffic share of about 10 Gbps.

During a system run, according to a service requirement, it may be desired to reduce the number of ID sub-interfaces of the interface Interlaken-0 to 5, increase the number of ID sub-interfaces of the interface Interlaken-1 to 12, and increase 3 RXAUIs, that is, to re-allocate existing caches block while maintaining a constant overall cache number.

For Interlaken-0, the number of ID sub-interfaces from is reduced from 10 to 5. 2 of the cache blocks not in use may be allocated to Interlaken-1, and the other 3 to the 3

RXAUIs. First for each of the 5 cache blocks not in use, a docking relation between the cache block and a corresponding original interface may be removed. Then, the 5 cache blocks may be hooked respectively to the two increased ID sub-interfaces in Interlaken-1 and to the 3 RXAUIs. In each cache, a dynamic cache allocating module may make sure that the handover occurs at the boundary of a complete packet. A dynamic configuration protecting module may ensure uniqueness of hook of an interface to a cache block. Then, the working mode of each interface may be configured, and normal packet inspection and receiving may be performed.

After all dynamic reconfiguration completes, the system may continue to work according to the new configuration without any stop or impact, ensuring dynamic system topology modification.

In an aforementioned embodiment herein, the disclosure has been illustrated with an example in which the overall number of interfaces supported by the system is no less than the overall number of cache blocks. Of course, an embodiment herein is not limited to such an environment, but may also apply to a scene in which a number of interfaces supported by the system is less than the number of cache blocks. For example an Interlaken interface, although being just one interface, when working in the interleaving mode, may correspond to a number of cache blocks for interleaving purposes.

Embodiment 5

Figure 7:
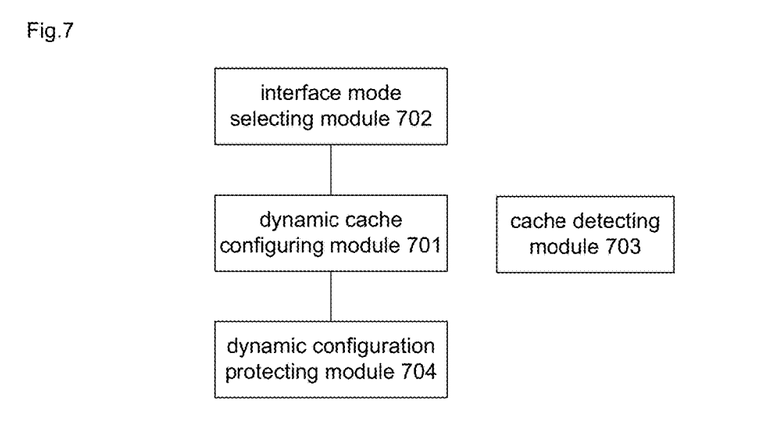
FIG. 7 is a diagram of a structure of a device for dynamic interface cache allocation according to an embodiment herein.

The embodiment may provide a device for dynamic interface cache allocation. The device may be located in a router. As shown in FIG. 3 and FIG. 7, the device may include an interface, a cache block, and a dynamic cache configuring module 701.

The dynamic cache configuring module 701 may be configured for: setting, in advance or while a system is running, a docking relation of an interface requiring access in application with a cache block available, and then transferring a data packet input by the interface into the cache block.

The dynamic cache configuring module 701 may be configured for: while the system is running, when it is determined that a change in an interface requiring access is required, adjusting, in real time, a docking relation of an interface involved in the change with a cache block corresponding to the interface involved in the change.

The dynamic cache configuring module 701 may be configured for: when it is determined that a change in an interface requiring access is required, adjusting, in real time, a docking relation of an interface involved in the change with a cache block corresponding to the interface involved in the change, by:

when it is determined that a new interface is to be added, detecting a cache block available in the system, and setting a docking relation of the new interface with the detected cache block available;

when it is determined that an interface is to be withdrawn during the run, removing a docking relation of the interface to be withdrawn with a cache block corresponding to the interface to be withdrawn;

when it is determined that an interface is to be replaced during the run, first removing a docking relation of the to-be-replaced interface with a cache block corresponding to the to-be-replaced interface, and then setting a docking relation of a replacing interface with the cache block corresponding to the to-be-replaced interface before the replacement.

In the embodiment, the dynamic cache configuring module 701 may be a core module in the device. The module may be configured for: after a docking relation of an interface requiring access/a new interface with a cache block available is set, detecting a starting position of a present data packet being input by the interface; after such a position is detected, making the cache block start receiving the data packet.

The module may be configured for: when it is determined that the interface requiring access is to be withdrawn, detecting an ending position of a present data packet; after such a position is detected, starting removing a docking relation of the interface to be withdrawn with a cache block corresponding to the interface to be withdrawn. In such a case, a data packet having been deposited in the cache block is not affected, and will be dispatched normally.

The device may further include an interface mode selecting module 702 configured for: setting a working mode of each interface requiring access, such as a packet type, an interface type supported by the interface, etc. to select to transmit a packet compatible with the mode, and while the system is running, selecting and transferring a packet compatible with a working mode of an interface. A packet type may include a whole packet mode and/or an interleaving mode, etc. A whole packet mode may refer to delivery of data packets with identical IDs. An interleaving mode may refer to alternating delivery of data packets with different IDs.

The device may further include a cache detecting module 703 configured for: detecting a data packet transferred from the interface into the cache block, discarding a data packet incompatible with a detection rule, and storing a data packet compatible with the detection rule in the cache block for subsequent dispatch or output.

The device may further include a dynamic configuration protecting module 704 configured for: detecting, in real time, a docking relation between a cache block and an accessing interface, and warning when it is determined that the cache block and the accessing interface are not in one-on-one correspondence.

In an embodiment herein, to ensure uniqueness of a connection between a cache block and an interface, namely, one-on-one correspondence between a cache block and an interface, one interface may access no more than one cache block. It is required to detect present configuration for any cache block. In case of a misconfiguration by a user, the misconfiguration may be rejected. At the same time, an interrupting reporting warning software may be generated, informing a user to inspect present configuration for all cache blocks. After a setting of a docking relation of an interface with a cache block takes effect, the interface may dock with the cache block exclusively. In docking an interface with a cache block, when any other cache block is presently in a docking relation with the interface, the present configuration cannot take effect. In this case, a warning may be issued to require a user to re-inspect configuration of all cache blocks.

Those skilled in the art will know that an embodiment herein may provide a method, system, or computer program product. Therefore, an embodiment herein may take on a form of hardware, software, or a combination thereof. In addition, an embodiment herein may take on a form of a computer program product implemented on one or more computer available storage media (including but not limited to, magnetic disk memory, optic memory, and the like) containing computer available program codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams.

Correspondingly, an embodiment herein may further provide a non-transitory computer-readable storage medium, storing a computer program configured for executing a method for dynamic interface cache allocation of an embodiment herein.

What described are merely embodiments of the disclosure, and are not intended to limit the protection scope of the disclosure.

The invention claimed is:

1. A method for dynamic interface cache allocation, comprising:
   equally dividing a cache into multiple cache blocks, each with a size no less than a maximal data-packet size;
   setting a multi-input multi-output cross matrix between interfaces and the cache;
   setting, in advance or while a system is running, a docking relation of an interface requiring access in application with a cache block available, and then transferring a data packet input by the interface into the cache block;
   while the system is running, when it is determined that a change in an interface requiring access is required, adjusting, in real time, a docking relation of an interface involved in the change with a cache block corresponding to the interface involved in the change,
   wherein the setting, in advance or while a system is running, a docking relation of an interface requiring access in application with a cache block available comprises:
   connecting, through the cross matrix, an input of the interface to the cache block,
   wherein the when it is determined that a change in an interface requiring access is required, adjusting, in real time, a docking relation of an interface involved in the change with a cache block corresponding to the interface involved in the change comprises:
   when a new interface is to be added, detecting a cache block available in the system, and connecting, through the cross matrix, an input of the new interface with the detected cache block available;
   when an interface is to be withdrawn during the run, disconnecting, from the interface to be withdrawn, a cache block corresponding to the interface to be withdrawn;
   when an interface is to be replaced during the run, first disconnecting, from the to-be-replaced interface, a cache block corresponding to the to-be-replaced interface, and then connecting, through the cross matrix, an input of a replacing interface with the cache block corresponding to the to-be-replaced interface before the replacement,
   wherein the method further comprises:
   after an input of an interface requiring cache access or a new interface is connected with a cache block available, detecting a starting position of a present data packet being input by the interface; after such a position is detected, making the cache block start receiving the data packet,
   wherein the method further comprises:
   when the interface requiring cache access is to be withdrawn, detecting an ending position of a present data packet; after such a position is detected, starting disconnecting, from the interface to be withdrawn, the cache block corresponding to the interface to be withdrawn,
   wherein the method further comprises:
   detecting, in real time, connection between a cache block and an accessing interface, and issuing a warning when it is determined that the cache block and the accessing interface are not in one-on-one connection.

2. The method according to claim 1, further comprising:
   setting a working mode of each interface requiring access, and while the system is running, transferring a packet compatible with a working mode of an interface.

3. The method according to claim 1, further comprising:
   detecting a data packet transferred from the interface into the cache block, discarding a data packet incompatible with a detection rule, and storing a data packet compatible with the detection rule in the cache block for subsequent dispatch or output.

4. A device for dynamic interface cache allocation, comprising:
   a processor; and
   memory storing instructions executable by the processor to perform a method for dynamic interface cache allocation, the method comprising:
   equally dividing a cache into multiple cache blocks, each with a size no less than a maximal data-packet size;
   setting a multi-input multi-output cross matrix between interfaces and the cache;
   setting, in advance or while a system is running, a docking relation of an interface requiring access in application with a cache block available, and then transferring a data packet input by the interface into the cache block;
   while the system is running, when it is determined that a change in an interface requiring access is required, adjusting, in real time, a docking relation of an interface involved in the change with a cache block corresponding to the interface involved in the change,
   wherein the setting, in advance or while a system is running, a docking relation of an interface requiring access in application with a cache block available comprises:

connecting, through the cross matrix, an input of the interface to the cache block, wherein the when it is determined that a change in an interface requiring access is required, adjusting, in real time, a docking relation of an interface involved in the change with a cache block corresponding to the interface involved in the change comprises:

when a new interface is to be added, detecting a cache block available in the system, and connecting, through the cross matrix, an input of the new interface with the detected cache block available;

when an interface is to be withdrawn during the run, disconnecting, from the interface to be withdrawn, a cache block corresponding to the interface to be withdrawn;

when an interface is to be replaced during the run, first disconnecting, from the to-be-replaced interface, a cache block corresponding to the to-be-replaced interface, and then connecting, through the cross matrix, an input of a replacing interface with the cache block corresponding to the to-be-replaced interface before the replacement, wherein the method further comprises:

after an input of an interface requiring cache access or a new interface is connected with a cache block available, detecting a starting position of a present data packet being input by the interface; after such a position is detected, making the cache block start receiving the data packet, wherein the method further comprises:

when the interface requiring cache access is to be withdrawn, detecting an ending position of a present data packet; after such a position is detected, starting disconnecting, from the interface to be withdrawn, the cache block corresponding to the interface to be withdrawn, wherein the method further comprises:

detecting, in real time, connection between a cache block and an accessing interface, and issuing a warning when it is determined that the cache block and the accessing interface are not in one-on-one connection.

5. The device according to claim 4, wherein the method further comprises:

setting a working mode of each interface requiring access, and while the system is running, transferring a packet compatible with a working mode of an interface.

6. The device according to claim 4, wherein the method further comprises:

detecting a data packet transferred from the interface into the cache block, discarding a data packet incompatible with a detection rule, and storing a data packet compatible with the detection rule in the cache block for subsequent dispatch or output.

7. A non-transitory computer-readable storage medium having stored therein instructions that, when executed by a processor, cause the processor to perform a method for dynamic interface cache allocation, the method comprising:

equally dividing a cache into multiple cache blocks, each with a size no less than a maximal data-packet size;

setting a multi-input multi-output cross matrix between interfaces and the cache;

setting, in advance or while a system is running, a docking relation of an interface requiring access in application with a cache block available, and then transferring a data packet input by the interface into the cache block;

while the system is running, when it is determined that a change in an interface requiring access is required, adjusting, in real time, a docking relation of an interface involved in the change with a cache block corresponding to the interface involved in the change, wherein the setting, in advance or while a system is running, a docking relation of an interface requiring access in application with a cache block available comprises:

connecting, through the cross matrix, an input of the interface to the cache block, wherein the when it is determined that a change in an interface requiring access is required, adjusting, in real time, a docking relation of an interface involved in the change with a cache block corresponding to the interface involved in the change comprises:

when a new interface is to be added, detecting a cache block available in the system, and connecting, through the cross matrix, an input of the new interface with the detected cache block available;

when an interface is to be withdrawn during the run, disconnecting, from the interface to be withdrawn, a cache block corresponding to the interface to be withdrawn;

when an interface is to be replaced during the run, first disconnecting, from the to-be-replaced interface, a cache block corresponding to the to-be-replaced interface, and then connecting, through the cross matrix, an input of a replacing interface with the cache block corresponding to the to-be-replaced interface before the replacement, wherein the method further comprises:

after an input of an interface requiring cache access or a new interface is connected with a cache block available, detecting a starting position of a present data packet being input by the interface; after such a position is detected, making the cache block start receiving the data packet, wherein the method further comprises:

when the interface requiring cache access is to be withdrawn, detecting an ending position of a present data packet; after such a position is detected, starting disconnecting, from the interface to be withdrawn, the cache block corresponding to the interface to be withdrawn, wherein the method further comprises:

detecting, in real time, connection between a cache block and an accessing interface, and issuing a warning when it is determined that the cache block and the accessing interface are not in one-on-one connection.

* * * * *